(Model.)

2 Sheets—Sheet 1.

C. C. DICKERMAN & D. POWERS.
REGISTERING LOCK.

No. 265,584.

Patented Oct. 10, 1882.

Witnesses

Inventor,
C. C. Dickerman
Daniel Powers

N. PETERS. Photo-Lithographer, Washington, D. C.

(Model.)
2 Sheets—Sheet 2.
C. C. DICKERMAN & D. POWERS.
REGISTERING LOCK.
No. 265,584.  Patented Oct. 10, 1882.
*Fig. 21.*
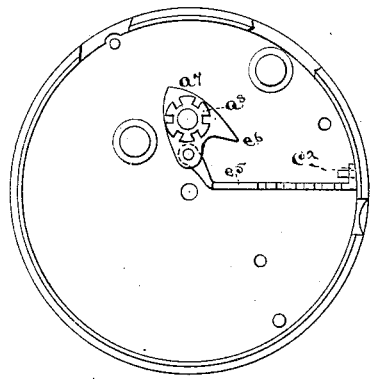
*Fig. 22.*     *Fig. 17.*
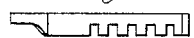 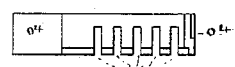
*Fig. 12.*   *Fig. 13.*   *Fig. 14.*   *Fig. 15.*   *Fig. 16.*   *Fig. 18.*   *Fig. 20.*
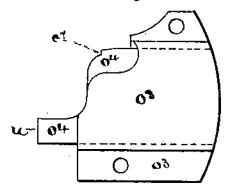 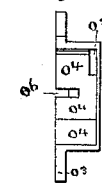 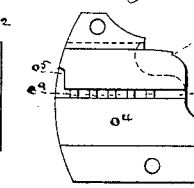 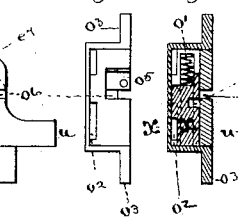 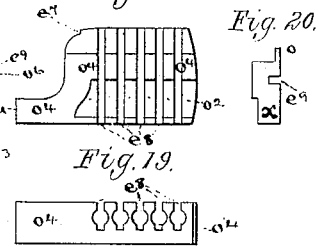 
*Fig. 19.*
*Fig. 23.*
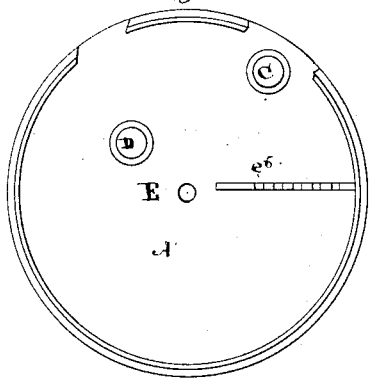
Witnesses
A. W. Ward
J. B. Toust
Inventor
C. C. Dickerman
Daniel Powers
N. PETERS, Photo-Lithographer, Washington, D. C.

UNITED STATES PATENT OFFICE.

CHARLES C. DICKERMAN, OF BOSTON, AND DANIEL POWERS, OF SHELBURNE, MASS.; SAID POWERS ASSIGNOR TO SAID DICKERMAN.

REGISTERING-LOCK.

SPECIFICATION forming part of Letters Patent No. 265,584, dated October 10, 1882.

Application filed January 14, 1882. (Model.)

*To all whom it may concern:*

Be it known that we, CHARLES C. DICKERMAN, of Boston, in the county of Suffolk and Commonwealth of Massachusetts, and DANIEL POWERS, of Shelburne, in the county of Franklin, in said Commonwealth, have invented a new and useful Improvement in Padlocks, of which the following is a specification.

Our invention relates to that class of padlocks known as "indicating and registering" padlocks, the object of it being to produce a padlock of great strength and durability, simple in construction, comparatively inexpensive, absolutely impossible to unlock with anything but its true key, and which will automatically indicate and register by consecutive number each unlocking and locking of it.

Our invention consists in the form, construction, and arrangement of the locking and securing devices in the shell, and the form, construction, and arrangement of the registering devices in the shell.

The locking devices, which consist of a sliding block, which we call the "tumbler-carrier," containing in it the tumblers, a safety-guard, and a small metallic bar located in a groove in the tumbler-carrier, which we will term a "fence," are placed in one part of the shell, the hasp and locking-dog partly in and between both parts of the shell, and the devices for registering, which consist of a series of circular concentric plates called the "numeral-plates," the pawls which engage and move the numeral-plates, the lever carrying the pawls, and the spring-dogs which hold the numeral-plates in position, are placed in the other part of the shell, all so arranged that when the two parts of the shell are secured together each part will perform the functions expected of it in connection with the other parts.

Figure 1:
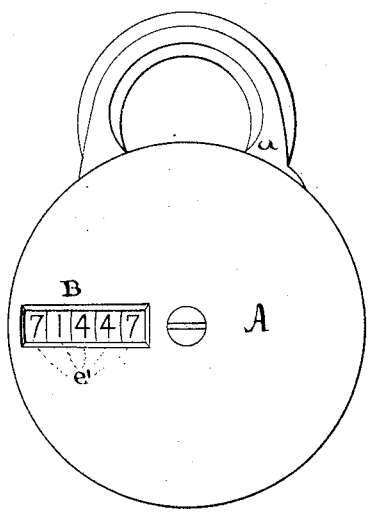
Figure 2:
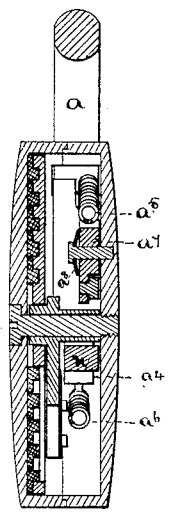
Figure 3:
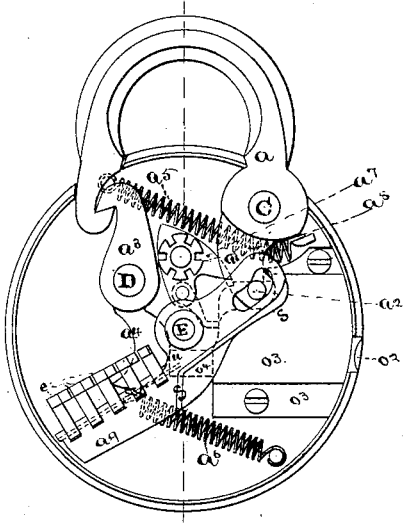
Figure 4:
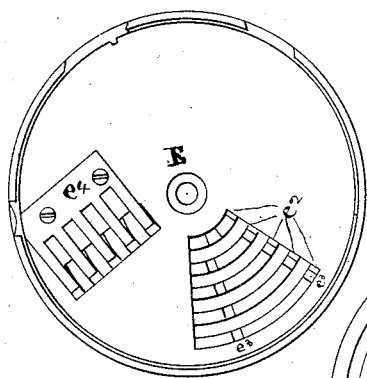
Figure 5:
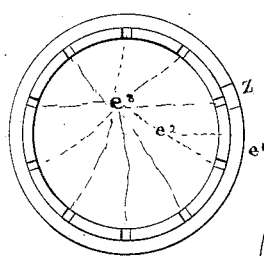
Figure 6:
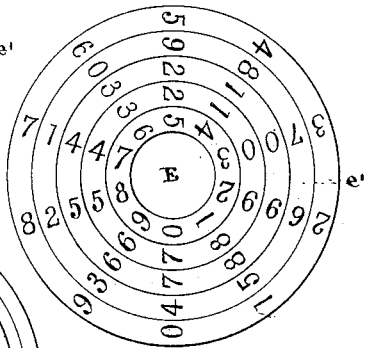
Figures 7, 8:
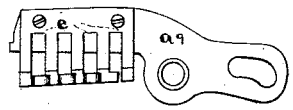
Figures 9, 11:
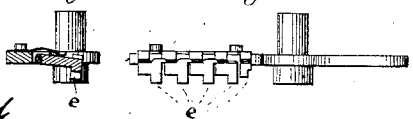
Figure 10:
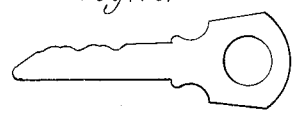

In the drawings annexed, Figure 1 shows a front side view of the padlock locked, having an opening through the shell to expose to view the registering-figures. Fig. 2 shows a vertical cross-sectional view of the shell and a portion of the locking and registering devices in it. Fig. 3 shows the back or lower part of the shell open and a portion of the locking devices, and the lever transmitting motion from the hasp to the numeral-plates. Fig. 4 shows the front or upper part of the shell, and the cover or plate over the numeral-plates, with openings through which the pawls reach the numeral-plates, and the spring-dogs which hold the numeral-plates in position. Fig. 5 is a view of the under or back side of the numeral-plate, having a flange on it perpendicular to the plane of the face of the plate, with ten notches in it at equal distances apart, and one notch in the flat part of it, in which the pawls engage to move the numeral-plates, and into which the spring-dogs fall to keep the numeral-plates in position. Fig. 6 shows a front view of five numeral-plates in position, with their faces in a plane, as laid in the padlock for service. Fig. 7 shows the opposite side of the plate or cover shown in Fig. 4, with the grooves in which the flanges on the numeral-plates work. Fig. 8 shows the front or top side view of the pawl-carrying lever, with the pawls and their springs on it. Fig. 9 shows an edge view of the lever shown in Fig. 8, and the working ends of the pawls and their springs. Fig. 10 shows a side view of the key used in this padlock. Fig. 11 shows an end view of the pawl-bearing lever and a side view of one of the pawls. Fig. 12 shows a top view of the case or cover in or under which the tumbler-carrier is placed. Fig. 13 shows a front end view of Fig. 12, and of the tumbler-carrier and the gate in it through which the fence works, and the keyway. Fig. 14 shows the reverse or under side of Fig. 12, the case or cover of the tumbler-carrier, and the tumbler-carrier in it, and the gate in the tumbler in which the fence is placed. Fig. 15 shows a rear end view of the case of the tumbler-carrier and of the tumbler-carrier in it, the gate for the fence, the keyway, and a cavity to give room for the flange on the end of the fence, and the stud in the shell on which the flange on the fence is supported and guided. Fig. 16 shows a cross-section of the tumbler-carrier, its cover or case, a tumbler in it, a tumbler-spring, the keyway, and the gate in the tumbler-carrier for the fence. Fig. 17 shows a top edge view of the tumbler-carrier with the grooves in it for the tumblers. Fig. 18 shows a front side view of the tumbler-carrier with the grooves in it for the tumblers. Fig. 19 shows a bottom edge view of the tumbler-carrier with the openings in it in which the tumbler-springs are located. Fig. 20 shows a side view of the tumbler with a notch, which we call a "gate," in it, and the pivot on the end of it, which enters the spiral spring which throws the tumbler to its proper position when the padlock is locked, a notch in the upper left corner which corresponds to the keyway in the tumbler-carrier. The number of tumblers in a padlock may be from one upward to five, or even more, according to the number of changes in the combination desired. These tumblers have the gate in them which passes over the fence located differently in each one, and the tumbler-carrier cannot be moved forward to disengage the locking-dog from the hasp until all the gates for the fence in all the tumblers are in exact line over the fence, and when they are so the tumbler-carrier can be pushed forward with the key, it and the tumbler sliding over the fence without moving it. Fig. 21 shows the inside of the back or lower part of the shell with the studs upon which the hasp and locking-dog are pivoted, and the safety-guard, and a small notched bar, which is termed a "fence," pivoted at one end to the safety-guard and extending through a groove called a "gate," in the under side of the tumbler-carrier, (which is not shown in this figure,) to the outer circumference of the inside of the shell, where it has a flange with a hole through it, which goes over a small stud or pin in the shell of the padlock. Fig. 22 is a side view of the metal bar called a "fence;" Fig. 23, inside view of one side of the shell, showing the fence in a fixed position.

The letters used represent the same part in all the figures.

A is the shell or case of the padlock.

B is the opening in the front side of the shell, through which the figures on the numeral-plates show and indicate the number of times the padlock has been unlocked and locked. This opening is covered with glass or other transparent substance set in the inside of the metal of the shell, protecting the numeral-plates from being moved from the outside.

C is a stud or pivot on which the hasp works.

D is a stud on which the locking-dog is pivoted.

E is the stud in the center of the padlock, which extends from one part of the shell to the other, bracing both against outward pressure or blows and securing the two parts of the shell together, and also serving as a fulcrum for the pawl-bearing lever and a center around which the numeral-plates revolve.

$a$ is the hasp, swinging upon the stud C, having a catch on the inner side of its locking end, and an arm beyond the stud C with a stud on it which works in an opening through the pawl-carrying lever.

$a'$ is the arm on the rear end of the hasp.

$a^2$ is the stud on the arm of the hasp.

$a^3$ is a swinging locking-dog with a catch on its working end, which is made to engage the catch on the locking end of the hasp. It is pivoted on the stud D, and is actuated and held in place by a spring which throws its catch into the catch of the hasp when that is brought down, and holds it there until it is disengaged by a forward movement of the tumbler-carrier striking the arm on the lower end of it.

$a^4$ is the arm on the lower end of the locking-dog.

$a^5$ is the spring which throws the hasp back when it is disengaged from the catch of the locking-dog.

$a^6$ is a spring which throws the catch of the locking-dog forward when the hasp is brought down and the tumbler-carrier is released from pressure by the key, causing it to engage and retain the catch of the hasp and lock the padlock.

$a^7$ is what is termed the "safety-guard," which, in connection with the fence, blocks the forward movement of the tumbler-carrier whenever anything is inserted in the keyway but the true key of the padlock, by vibrating on its supporting-stud.

$a^8$ is a spring-washer over the safety-guard on the same stud, to prevent any movement of the safety-guard $a^7$, except as it is forced by a movement of the fence.

$a^9$ is the pawl-carrying lever, having the central stud, E, as its fulcrum, and an opening through it in which the stud $a^2$ on the arm of the hasp works, whereby the lever is given a reciprocating motion when the hasp is raised and lowered. This lever is beveled on the lines $s\ s$ to make room for the spring-dogs $e^4$, over which it passes. When the hasp is raised the end of this lever bearing the pawls is thrown backward to be in position to engage a notch in the flange of the numeral-plates, and when the hasp is brought down the pawl end of the lever is driven forward, and the pawls, engaging the notches in the flange of the numeral-plates which they are intended to engage, carry them forward and register one additional by the figures exposed at the opening B at the front of the padlock. $e\ e$ are the pawls on the lever $a^9$, so placed and arranged that they work into the notches in the flanges on the back of the numeral-plates, one or more of which is carried forward one notch or number when the hasp is lowered into its place, so that the catch of the locking-dog will engage it. Each of these pawls, except the inner one, has a foot extending down a little below the part which is to engage the notches in the flanges of the numeral-plates, and which slides around on the flat part of the back of the numeral-plate next inside of the one which the pawl is to engage, carrying the pawl a little above the top of the flange on the numeral-plate, so that it cannot engage any of the notches in the flange of the numeral-plate under it until the foot reaches and falls into a notch in the flat part of the next inside numeral-plate made to receive it, there being only one such in each numeral-plate. When the foot falls into this notch then the pawl will engage a notch in the flange of the numeral-plate next outside, and carry it forward one notch or registering-figure, showing through the opening in the front of the padlock that ten numbers have been registered, or that ten numbers have been registered since the foot had fallen into the notch, described before. Thus the innermost numeral-plate is carried entirely around once before and when the next outer numeral-plate is engaged by the pawl over its flange and carried forward one notch, so that if all the numeral-plates had showed the cipher in the beginning the inner plate would have brought the cipher around so as to show again and the next plate would show the figure 1. The second pawl from the center carries all the pawls outside of it above the top of the flanges of the numeral-plates by a lip on each extending a little over the pawl inside of it, so that none of the outer numeral-plates can be engaged and moved by the pawls until the numeral-plate next inside has been carried entirely around. Thus when the innermost numeral-plate has been carried clear around ten times the next outer one will have been carried entirely around once, and the foot of the next outer pawl, sliding around on its flat part, will fall into the notch in it, and the pawl will engage a notch in the flange of the second outer plate and carry it forward one notch or figure, and show the opening in the front of the padlock, the figures indicating one hundred, (100,) and when the innermost numeral-plate has been carried around one hundred times and the next outer numeral-plate has been carried around ten times, and the second outer numeral-plate has been carried around once, then the foot of the third pawl will fall into the notch in the flat part of the numeral-plate inside of it, and the pawl will engage a notch in the flange of the next outer plate and move it forward one notch or figure, showing the figures indicating one thousand, (1000,) and so on until the numerating capacity of all the numeral-plates combined has been completely taken up, five plates numbering ten thousand opening and closing of the hasp of the padlock.

$e'$, Fig. 6, are the numeral or registering plates, flat, circular, concentric, each having the numerals one to nine, inclusive, and a cipher on its face, filling the entire circumference at equal distances apart, the faces of all the plates being in a plane. A greater or less number of plates than five may be used by arranging the lever $a^9$ and pawls and spring-dogs to correspond with the number of plates. Each of the numeral-plates has a flange on its reverse or back side, standing out at right angles to the plane of its face, in which are cut ten notches having equal spaces between them and one notch in the flat part.

$e^2$ is the flange on the back of the numeral-plate.

$e^3$ are the notches in the flange of the numeral-plate; $z$, notch in the flat part of the back side of the numeral-plate.

$e^4$ is a set of spring-dogs, fastened on the outside of the plate covering the numeral-plates, the dogs reaching through an opening in the plate and engaging in the notches in the flanges on the numeral-plates to hold them in position as they were left by the last movement of the hasp and lever, until another movement of the hasps is made.

$e^5$, Fig. 21, is what we call a "fence," here shown as movable in the direction of its length, but it may be fixed, as shown in Fig. 23, in which case the safety-guard $a^7$ will be unnecessary. It is a small metal bar pivoted to the safety-guard $a^7$, having a perpendicular width of about twice its thickness, having as many notches or gates in its upper edge as there are tumblers in the tumbler-carrier, and extending to the circumference of the padlock in and through a groove in back side of the tumbler-carrier made for it at right angles to and across the grooves in the tumbler-carrier which carry the tumblers.

$e^6$ is the engaging-point of the safety-guard $a^7$.

$e^7$ is the shoulder in the forward part of the tumbler-carrier into which the engaging-point $e^6$ falls when the fence $e^5$ is moved, by forcing a false key or other instrument into the keyway, to attempt to unlock or pick the padlock; $e^8$, perpendicular grooves in the tumbler-carrier, in which the tumblers and their actuating-springs are placed; $e^9$, notches called "gates" in the tumblers; $c$, notches called "gates" in the fence $e^5$; $o$, a pivot on the end of the tumbler, which enters the hollow of a small spiral spring which keeps the tumbler in its proper position; $o'$, a small spiral spring to hold the tumbler in its proper position, so that its gate is not opposite the gate in the fence or in range with the gate in any other tumbler; $o^2$, the keyway in the tumbler-carrier; $o^3$, the cap or cover which secures and guides the tumbler-carrier; $o^4$, the tumbler-carrier, containing a groove for the fence, grooves for the tumblers and their springs, a keyway located to correspond with the notch in the tumblers in which the key works, and having a projecting forward end, which, when the tumbler-carrier is pushed forward by the key, will strike the arm of the locking-dog; $o^5$, a cavity in the rear part of the tumbler-carrier, to give room for the flange on the rear end of the fence, and the stud on the rim, which works in a hole through the flange of the fence.

$w$ is the forward and striking end of the tumbler-carrier $o^4$.

$c^2$ is the flange at the rear end of the fence, next the circumference of the shell, and the stud which supports and guides it.

$x$ is a tumbler, of which five are required in the padlock shown. These tumblers are located in grooves made in the tumbler-carrier for them and their springs in the side opposite to the groove for the fence and at right angles to it, and crossing it, cutting into it about half its depth and about half the width of the tumblers. Each tumbler has a gate or notch in the side of it toward the fence about half its width. These gates are placed at distances from the end of the tumbler, varying in each tumbler, so that if the tumblers are placed in exact range the gates will not be in range, and if the gates in the tumblers are not all in exact range one or more of the tumblers will have its solid substance lying through one or more of the gates in the fence, and consequently the tumbler-carrier cannot be moved forward and the padlock cannot be unlocked. Therefore to unlock the padlock all the gates in all the tumblers must be brought in exact range over the fence. This is only accomplished by a flat or plate key made and fitted for the lock, with its edge toward the tumblers in an irregular or crooked line, the irregularities in the line corresponding exactly to the differences in location in the tumblers of the gates through them, so that when the key is pushed into the keyway it acts like a wedge behind each of the tumblers, driving them out of range with each other, but bringing the gates in them all exactly in range, when the tumbler-carrier may be driven forward by pushing with the key, so that it will by its forward part strike the arm of the locking-dog and disengage its catch from the catch of the hasp, when the spring $a^5$ will throw up the hasp, and the padlock is unlocked.

It is obvious that to lock the padlock it is only necessary to bring the hasp down, when the spring $a^6$ will cause the catch of the locking-dog to engage the catch of the hasp. Each locking of the padlock moves the numeral-plates as before explained, to indicate one greater number in the opening in the front of the shell.

We claim as new and our invention—

1. The above-described improved padlock, consisting of the shell A, the hasp $a$, the locking-dog $a^3$, the sliding tumbler-carrier $o^4$, the tumblers $x$, the tumbler-springs $o'$, the safety-guard $a^7$, the fence $e^5$, and the tumbler-carrier cover $o^3$, locking devices, the numeral-plates $e'$, the pawl-bearing lever $a^9$, the pawls $e$, and the spring-dogs $e^4$, registering devices, all made and arranged in relation to each other substantially as described.

2. In a padlock, in combination with the shell, hasp, and locking-dog, the sliding tumbler-carrier $o^4$, tumbler-carrier cover $o^3$, and tumblers $x$, made substantially as described.

3. In a padlock, in combination with the shell, hasp, locking-dog, tumbler-carrier $o^4$, tumblers $x$, and tumbler-carrier cover $o^3$, the safety-guard $a^7$ and the fence $e^5$, made substantially as described.

4. A registering device for padlocks and other purposes, confined in a suitable case or shell, consisting of a series of concentric circular numeral-bearing plates $e'$, the pawls $e$, the spring-dogs $e^4$, and the lever $a^9$, in combination with any suitable device for actuating the lever.

CHARLES C. DICKERMAN.
DANIEL POWERS.

Witnesses:
A. W. WARD,
J. B. FOREST.